United States Patent [19]

Howard et al.

[11] Patent Number: 4,852,830
[45] Date of Patent: Aug. 1, 1989

[54] COMPUTER MONITER STAND

[75] Inventors: Robert A. Howard, Palo Alto; Robert Elliman, Cupertino, both of Calif.

[73] Assignee: Apple Computer, Inc., Cupertino, Calif.

[21] Appl. No.: 222,218

[22] Filed: Jul. 21, 1988

[51] Int. Cl.$^4$ .......................................... H04M 1/04
[52] U.S. Cl. ..................................... 248/183; 248/921
[58] Field of Search .............. 248/1 A, 1 C, 1 E, 1 F, 248/1 H, 1 I, 1 J, 558, 637, 646, 139, 371, 397, 179, 181, 183, 349, 660, 661, 663, 664, 666, 667, 670, 130, 131, 133, 137; 403/57; 108/103, 139, 142

[56] References Cited

U.S. PATENT DOCUMENTS

| | | | |
|---|---|---|---|
| 3,970,792 | 7/1976 | Benham | 248/183 |
| 4,494,720 | 1/1985 | Gregory | 248/371 |
| 4,562,988 | 1/1986 | Bumgardner | 248/349 |
| 4,564,166 | 1/1986 | Craft | 248/349 |
| 4,570,892 | 2/1986 | Czech | 248/1 F |
| 4,575,033 | 3/1986 | Henneberg | 248/1 F |
| 4,589,713 | 5/1986 | Pfuhl | 248/349 |
| 4,591,120 | 5/1986 | Bryant-Jeffries | 248/349 |
| 4,645,153 | 2/1987 | Granzow | 248/181 |
| 4,738,422 | 4/1988 | Matheson | 248/349 |
| 4,781,347 | 11/1988 | Dickie | 248/183 |

Primary Examiner—Ramon O. Ramirez
Assistant Examiner—Robert A. Olson
Attorney, Agent, or Firm—Blakely, Sokoloff, Taylor & Zafman

[57] ABSTRACT

A computer monitor stand is described having a platform for holding the computer monitor, a swivel piece and a base. The platform is coupled to the swivel piece. The swivel piece is coupled to the base. The base allows the swivel piece to rotate in a certain predetermined rotational angle. The swivel piece allows the platform to vary its angle of inclination. The platform is dynamically adjustable but still statically latching. The platform has a convexly curved bottom and a rack on that bottom; the bottom fits into a concavely curved top of the swivel piece. The concavely curved top includes a cantilevered pawl which engages the rack on the bottom of the platform.

10 Claims, 5 Drawing Sheets

FIG_1

FIG_4

FIG_5

FIG_6

FIG_7

FIG_8

COMPUTER MONITER STAND

BACKGROUND OF THE INVENTION

1. Field of the Invention

The field of the invention is that of computor monitor stands. More specifically the field is that of monitor stands that allow for adjustment of the angle of inclination and the rotational angle of the computer monitor.

2. Prior Art

Many monitor stand are known in the art. However, these prior art monitor stand either allow no movement of the computor monitor, or are too fluid, not reliably keeping the computor monitor in a set position. What is needed in the art is a dynamically adjustable monitor stand.

A problem common to all monitor stands is that of torque. Torque is calculated as a function of the weight of the computor monitor and the distance from the center of gravity of that monitor to the axis of inclination provided by the monitor stand. Ideally the center of gravity of the computor monitor is directly on the center of the axis of inclination provided by the monitor stand. However, this is rarely the case and hence monitor stands must compensate for this difference.

Problems with the dynamically adjustable monitor stands are related to the conditions in which they are used. Computer monitor stands are usually utilized in environments where they are exposed to a great deal of heat. Also the furniture on which these stands are placed are subjected vibration and other types of jolting. A dynamically adjustable monitor stand must be able to resist the torque created by the monitor in addition to compensating for the occasional extraneous force produced by vibration or jolting. However, in order for the stand to remain dynamic there must be some flexibility for a human operator to adjust the angle of inclination and the angle of rotation of the monitor.

Also, within these constraints a monitor stand should be both simple to construct and maintain, as well as being relatively inexpensive. This requires that the number of parts be minimized and the articles of construction be of lesser expense.

What is needed in the art is a monitor stand that is dynamically adjustable and yet can perform reliably in the environment in which it is used. Also needed is a monitor stand that is both easy to construct and inexpensive. One object of the present invention is to provide for such a dynamically adjustable monitor stand.

SUMMARY OF THE INVENTION

The present invention is a dynamically adjustable computer monitor stand. The monitor stand comprises a platform for placing the computor monitor upon, a swivel piece means, and a base for supporting the weight of the stand. The present invention allows for both adjustability of the angle of inclination of the computer monitor and the angle of rotation of the computor monitor. The monitor stand is designed to be used by a variety of different monitors. The design is also adaptable for use with inexpensive construction materials and still provide for safe support of the computor monitor.

The base typically has a rectangular shape and includes a pivot means which is located in a circular depression of the base. The swivel piece means includes a hole which is designed to receive the pivot means of the base to permit the rotation of the swivel means relative to the base. The swivel piece fits into the circular depression of the base such that the swivel piece has the ability to rotate around the pivot means. The swivel piece includes a concavely curved top which has a cantilevered pawl means. Typically, a swivel piece include two cantilevered pawl means. Each cantilevered pawl means have teeth and each cantilevered pawl means is an integral part of the concavely curved top of the swivel piece. The platform has a convexly curved bottom and includes a rack means on the bottom. The convexly curved bottom of the platform typically includes two rack means which are designed to engage the two cantilevered pawl means on the top of the swivel piece. The convexly curved bottom of the platform is designed to fit into the concavely curved top of the swivel piece. The rack means has corresponding teeth designed to cooperatively engage the teeth of the cantilevered pawl means to lock the platform in a fixed angular position of inclination when no substantial horizontal force is applied to the platform. The cantilevered pawl means and the rack means disengage when a substantially horizontal force is applied to the platform thereby allowing changes in the angular position of inclination of the platform.

DETAILED DESCRIPTION OF THE DRAWINGS

DETAILED DESCRIPTION OF THE PRESENT INVENTION

The present invention describes a computer monitor stand. In the following description numerous specific details are set forth in order to provide a thorough understanding of the present invention. It will be obvious, however, to one who is skilled in the art that the present invention may be practiced without these specific details. In other instances well known methods have not been described in detail so as not to unnecessarily obscure the present invention.

Figure 1:
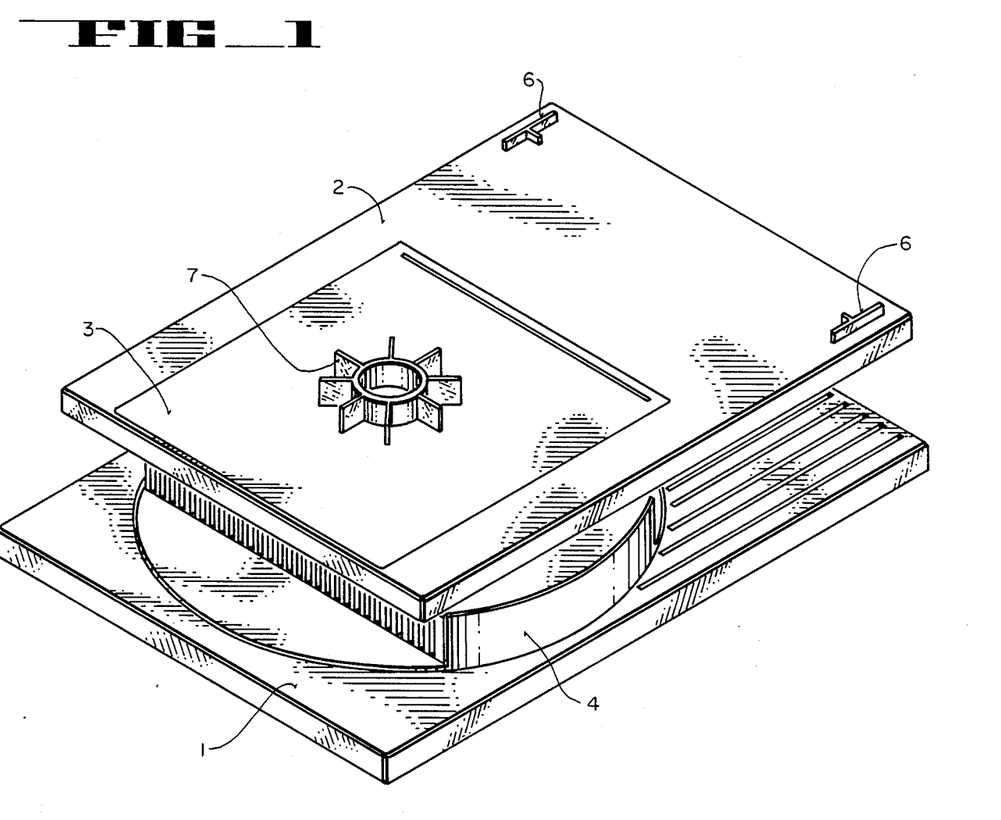
FIG. 1 shows a perspective view of the present invention.

A perspective view of the present invention is shown in FIG. 1. The monitor itself is placed upon a platform comprising platform 2, having on its upper surface a cover 3. On the surface of cover 3 is a monitor mount 7. In the preferred embodiment of the present invention cover plate 3 can be flipped over so as to have 2 different locations for monitor mount 7. FIG. 1 shows monitor mount 7 in the middle of cover 3 so as to be approximately ¼ of the length of the stand from the front of the stand. In the preferred embodiment the other side of the cover 3 would position the monitor mount 7 almost adjacent to the front of the stand. Near the rear of the platform 2 are two nubs 6, positioned one at each rear corner.

The platform 2 is mounted upon the swivel piece means 4. It is the platform 2 which can vary the angle of inclination of the monitor. The swivel piece means 4 is affixed atop base 1. It is swivel piece 4 which provides for the rotational angle adjustment by swiveling within its circular path mounted in base 1. Both base 1 and platform 2 are rectangular in shape and in the preferred embodiment base 1 is slightly larger in rectangular dimension than platform 2. Swivel piece 4 however, is circular in shape and fits in a circular path in base 1.

The monitor stand is constructed of an industrial plastic. In the preferred embodiment the type of plastic used is flame retardant and is ultraviolet stabilized. This provides safety features for both protection against fire and for the presence of fluorescent light bulbs. The monitor stand is usually put on top of a computer. Computing equipment often produces a great deal of heat. Typically not enough heat is produced to melt the plastic, but it must be noted that the plastic has different characteristics heated than when it is at room temperature. The structure of the present invention compensates for the reduced structural performance of the plastic in its heated state.

In the preferred embodiment of the present invention, the monitor stand is capable of reliably supporting approximately 35 pounds. The swivel piece 4 has an allowable angle of rotation of $\pm 45°$ from the orientation shown in FIG. 1. Once a monitor is placed at a particular angle of rotation, it tends to stay at that angle because of the weight of the monitor. However, a user can easily adjust the angle of rotation, as will become apparent from the discussion of the low friction discs in FIG. 6. The swivel piece 4, from its orientation parallel to the plane of base 1, has an allowable angle of inclination of $-10°$ to $+12°$. As will become apparent from the discussion of FIG. 5, this angle of inclination can be altered by a user yet not be altered by smaller physical forces acting on the stand.

Figure 2:
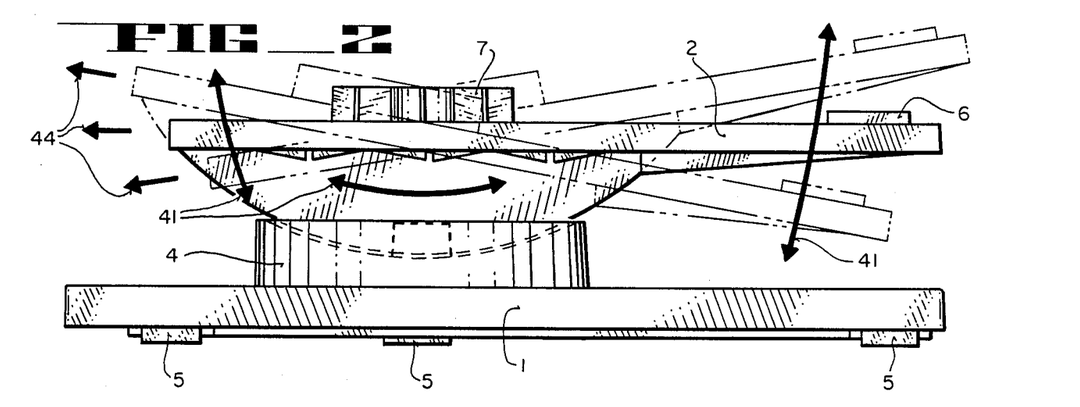
FIG. 2 shows a side view of the present invention showing the adjustability of the angle of inclination.

FIG. 2 shows a side view of the present invention. On the highest point is monitor mount 7. Monitor mount 7 is located on the highest point atop platform 2. When a monitor is placed upon the stand it will be oriented around monitor mount 7 although its weight will be distributed over various portions of platform 2. The bottom 200 of platform 2 is shaped as a perfect arc that is convexly curved with respect to the planar upper surface of the platform 2. That is, the outline of the bottom 200 of platform 2 forms a segment of the circumference of a circle. The bottom of platform 2 rests on swivel piece 4. The top of 25 swivel piece 4 is concavely curved (with respect to the base 1) to receive the convexly curved bottom 200 of platform 2. Allowing for platform 2 to move along tilt angle adjustment arrows 41 causes the various orientational direction arrows 44, which show different angles of inclination ("tilt") of the platform 2.

Underneath of swivel piece 4 is base 1. A plurality of feet 5 are located on the bottom of base 1. The feet 5 ultimately support the weight of the monitor. In the preferred embodiment of the present invention there are six feet 5. They are positioned such that one is at each of the four corners and two are spaced approximately under the center of swivel piece 4 with one of feet 5 being slightly to the left and the other of feet 5 being slightly to the right.

The curvature of the bottom 200 of platform 2 and the top 25 of swivel piece 4 are preferably matched. This allows for the movement and positioning of the angle of inclination of platform 2.

Figure 3:
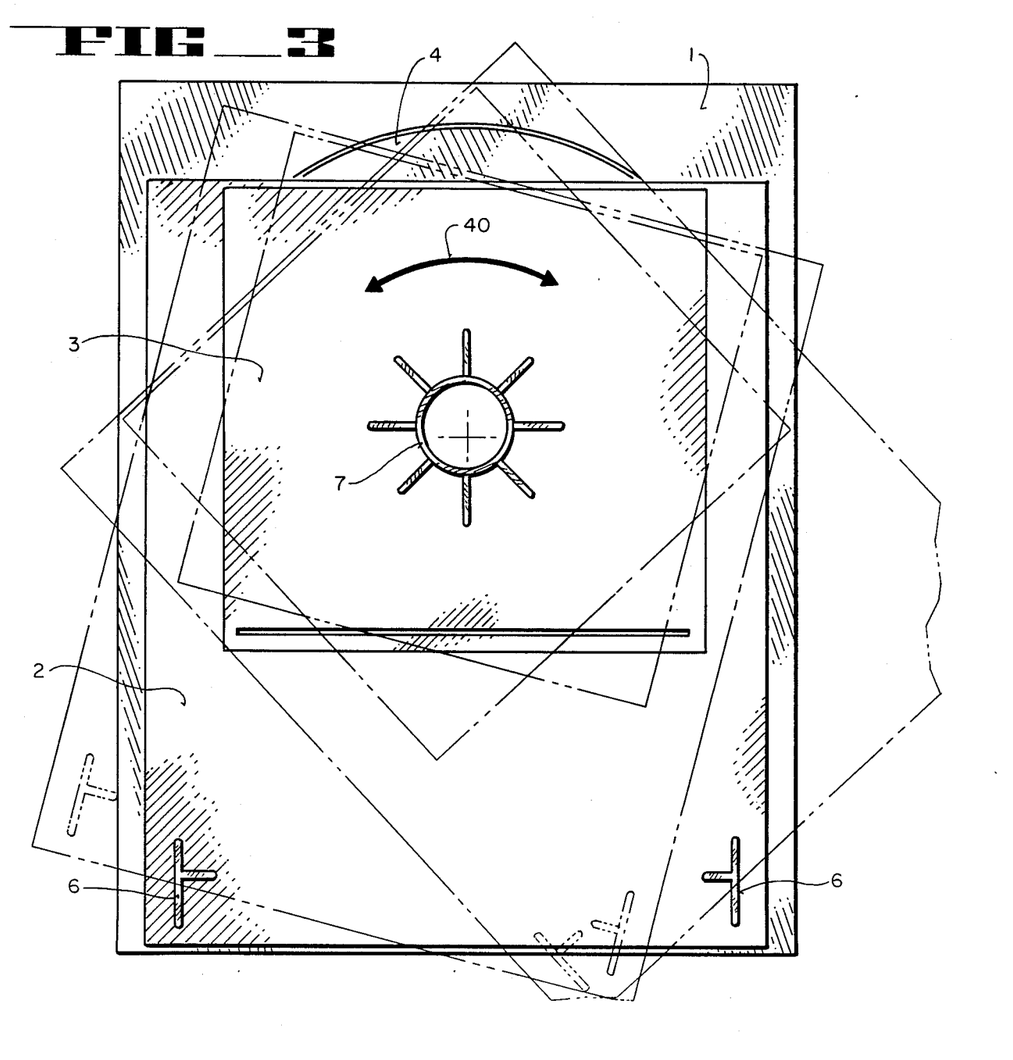
FIG. 3 shows a top view of the present invention showing the adjustability of the angle of rotation.

FIG. 3 shows a top view of the present invention. The platform 2 is shown in various angles of rotation. Monitor mount 7 on cover 3 protrudes from the top of platform 2. At the two rear corners of platform 2 are nubs 6. Underneath of platform 2 is base 1. Directly underneath of the platform 2 is the swivel piece 4 which is also referred to as a pivot means because it pivots to allow rotation of the platform 2. Pivot rotation arrow 40 shows the directions in which platform 2 can be moved. In the preferred embodiment of the present invention there is a restraint of the pivot rotation 40 caused by the interaction between the tongue 16 and the channel 17. However, it would be obvious to one skilled in the art that it would not be necessary to limit the rotation. In the preferred embodiment the rotational limitation is only for sake of convenience.

Figure 4:
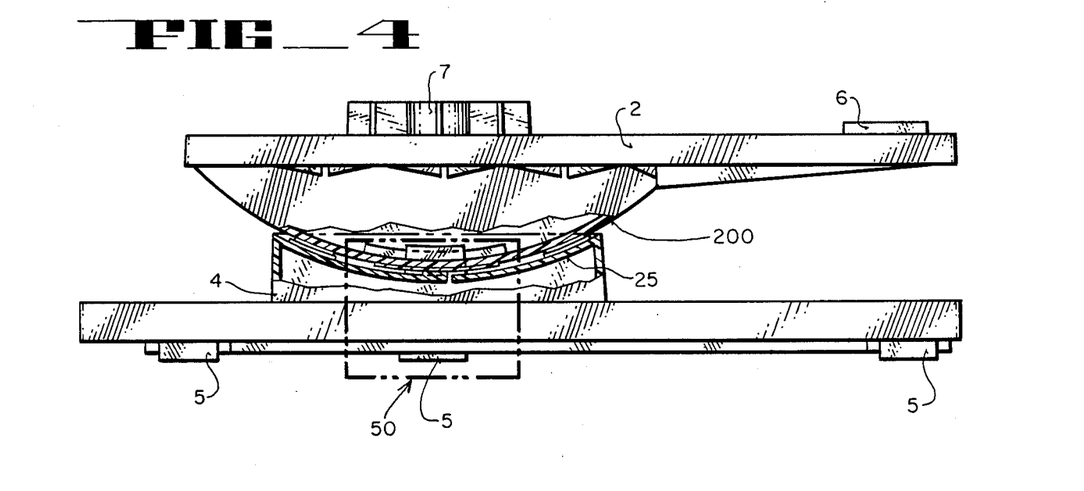
FIG. 4 shows a side cross-sectional view of the present invention.
Figure 5:
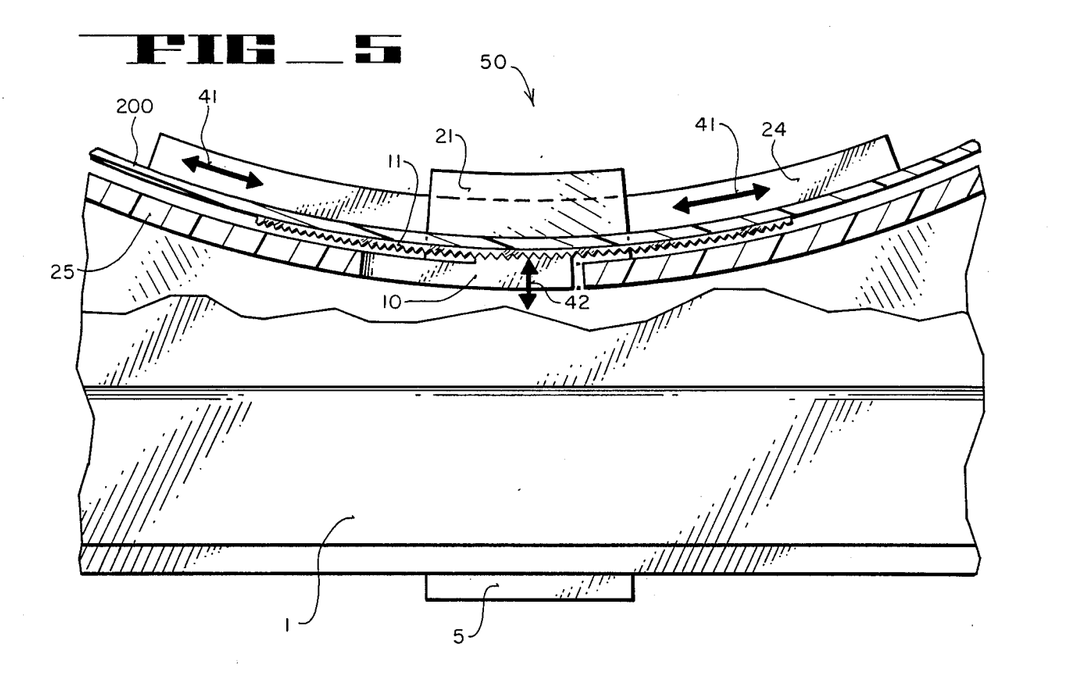
FIG. 5 shows a detailed cross-sectional view of the highlighted area of FIG. 4.

FIG. 4 shows a cross-sectional side view of the present invention. At the top is monitor mount 7 which is placed upon platform 2. At the rear of platform 2 are nubs 6 which may act as a backstop for a monitor resting on the platform 2. Platform 2 is located upon swivel piece 4. Swivel piece 4 in turn rests upon base 1. At the bottom of base 1 are feet 5 to support its weight. FIG. 5 shows that two of these feet 5 are attached to the bottom of base 1 so as to be positioned near the center of gravity of a monitor sitting on the monitor stand. Having support feet at this position helps prevent bowing of the base 1. A meshing section 50 is shown where the bottom of platform 2 and the top of swivel piece 4 interact.

A more detailed view of meshing section 50 is shown in the crosssectional view of FIG. 5. FIG. 5 shows the coupling between platform 2 and swivel piece 4 by the two hooks 21. Each hook 21 protrudes from swivel piece 4 through an opening 22 in the bottom 200 of platform 2 and latches over alignment wall 24 of the platform 2. Each hook 21 serves to couple platform 2 to the swivel piece 4 as well as to align its angular movement. The swivel piece 4 includes two hooks 21 which project upwardly from the concavely curved top surface of the swivel piece 4. The hooks 21 are positioned to protrude through two openings 22 (shown in FIG. 8) in the bottom 200 when the platform 2 is placed on top of swivel piece 4. Each hook 21 includes a restraining lip which extends over an alignment wall 24; the physical contact of the restraining lip against the upper edge of the alignment wall 24 locks the platform 2 to the swivel piece 4.

Figure 6:
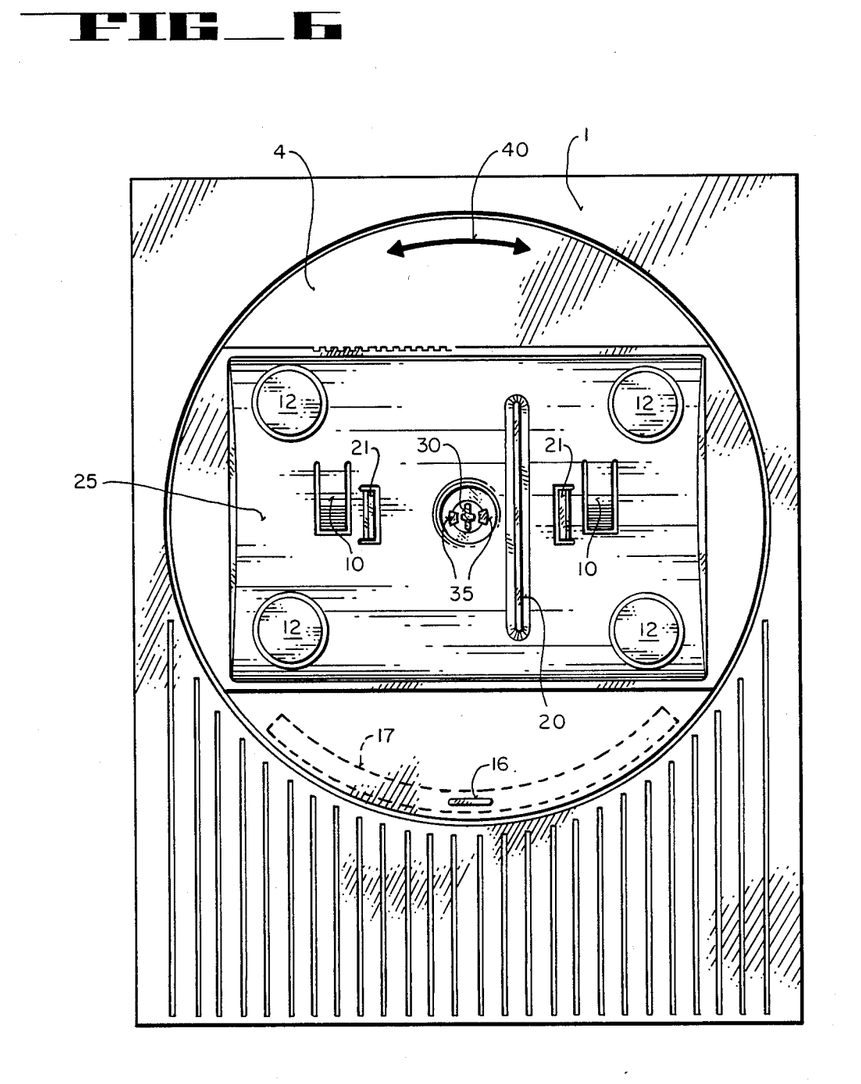
FIG. 6 shows a top view of the base and swivel piece of the present invention.

Referring again to FIG. 5, the interaction of cantilevered pawls 10 of swivel piece 4 and the racks 11 of platform 2 provides for the adjustable tilting of platform 2. The cantilevered pawl 10 is allowed to move up and down along movement arrow 42. Cantilevered pawls 10 are also shown in FIG. 6; it can be seen from FIG. 6 that the top 25 of the swivel piece 4 includes two cantilevered pawls 10 which are an integral part of top 25 and which extend from an attachment to the top 25. The cantilevered pawls 10 are typically made from a flexible plastic which permits the up and down movement of the pawls 10 along the movement arrow 42 shown in FIG. 5. When the platform 2 is fixed in a particular angle of inclination ("tilt"), it is statically fixed with respect to the swivel piece 4, and each cantilevered pawl 10 flexes against the corresponding rack 11 on the bottom 200 of the platform 2. As shown in FIG. 6, each cantilevered pawl 10 is disposed within an opening in the top 25 and each cantilevered pawl 10 is attached to the top 25 at the end of the pawl 10 which is opposite from the teeth of the pawl 10.

Figure 8:
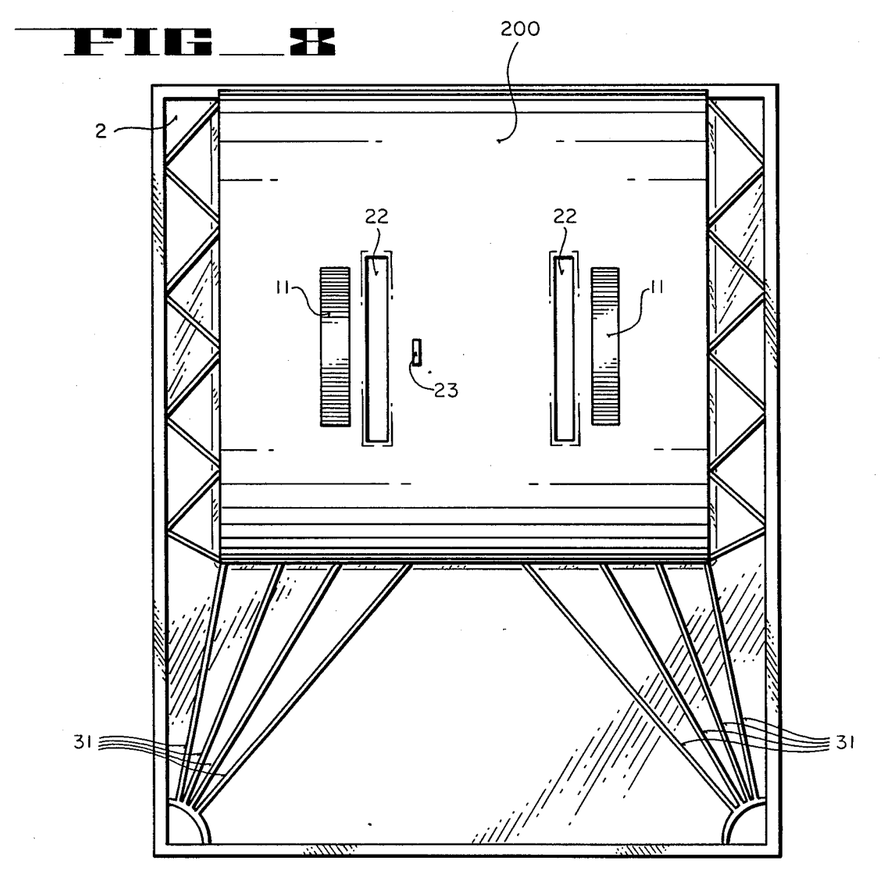
FIG. 8 shows a bottom view of the monitor platform of the present invention.

Each cantilevered pawl 10 has a plurality of teeth which include several peaks and valleys. As shown in FIG. 5, these teeth engage corresponding teeth on rack means 11 when the platform 2 is in a statically fixed position with respect to swivel piece 4. As shown in FIG. 8, the bottom 200 of platform 2 includes two racks 11. When the platform 2 is in a fixed position with respect to the swivel piece 4, the cantilevered pawls 10 engage the corresponding racks 11 on the swivel piece 4. In the preferred embodiment of the present invention, the peaks of each rack 11 form 90° angles. The valleys of rack 11 form 90.5° angles. Correspondingly the peaks of each cantilevered pawl 10 are 90.5° and the valleys of cantilevered pawl 10 are 90°. This provides for optimal meshing of cantilevered pawl 10 and the rack means 11, so that the static friction when those two elements are meshed is sufficiently high to latch the platform 2 to the swivel piece 4.

The pawl 10 meshes with the rack 11 more firmly when a weight (such as a computer monitor) is placed on top of platform 2. That is, a downward (vertical) force on the platform 2 will normally cause each pawl 10 to firmly engage with its corresponding rack 11 to thereby keep the platform 2 at a fixed angle of inclination.

To change the tilt of the platform 2, one applies a substantially horizontal force to the platform 2, which force causes the platform 2 to "roll" in the swivel piece 4. The "rolling" of platform 2 occurs in the direction of the arrows 41 shown in FIG. 5. The rolling occurs because the teeth of the pawls 10 and the corresponding teeth of the racks 11 slip over each other rapidly (thereby never engaging each other in a firm manner) during the application of a horizontal force to the platform 2.

FIG. 6 shows a top view of the base 1 and swivel piece 4. Base 1 has a pivot 30 located in the center of swivel piece 4. Swivel piece 4 is affixed to base 1 by insertion over pivot 30. Swivel piece 4 includes a hole designed to receive the pivot 30 and the snaps 35. Snaps 35 are located around pivot 30 to hook over the edges of the hole of swivel piece 4 and affix the swivel in piece 4 in place. Snaps 35 cannot be bent backwards much farther than to allow for inserting swivel piece 4 because pivot 30 prohibits such excessive movement. Base 1 also has a channel 17 (shown hidden below swivel piece 4). Channel 17 serves to define the possible rotational positions that swivel piece 4 can assume.

On the bottom of swivel piece 4 is tongue 16. Tongue 16 extends into channel 17. When tongue 16 reaches one end of channel 17 the pivoting ability of swivel piece 4 terminates. The ends of channel 17 thereby define the ends of possible rotational positions. Near the four corners of the top 25 are low friction discs 12. On one side of pivot 30 is an alignment slot 20. On both sides of pivot 30, spaced equidistant from pivot 30, are two hooks 21. The hooks 21 are placed such that alignment slot 20 lies between one of the hooks and the pivot 30. Also aligned equidistant from pivot 30 are two cantilevered pawls 10. Both hooks 21 and alignment slots 20 are between the two cantilevered pawls 10.

The low friction discs 12 are made from an ultra high molecular weight polyethylene. This is to make the contact between the surface of the top 25 of the swivel piece 4 and the bottom 200 of platform 2 as nonabrasive as possible. Low friction discs 12 help to prevent the erosion of the surfaces that are coupled. Also, columns extend underneath each of the low friction discs 12 to a similar low friction disc to contact the top surface of base 1. This provides for a nonabrasive rotation of swivel piece 4. The low friction discs 12, in the preferred embodiment, are approximately 1 mm thick having a 13.5 mm radius. Suitable materials to fabricate the low friction discs 12 include 3 M High Tack #950 and Avery Fastape 445.

In addition, the four columns underneath the low friction discs 12 provide for a more balanced distribution of the weight of the monitor. As indicated above the cantilevered pawls 10 dynamically latch to the rack 11 on to the bottom of platform 2. The hooks 21 are for latching the platform 2 and the swivel piece 4 together by fitting over the alignment wall 24 of the platform 2.

The snaps 35 are latching mechanisms whereby the swivel piece 4 is inserted over the pivot 30, with the snaps 35 snapping and latching onto the swivel piece 4. The snaps 35 are reinforced by the center piece of the pivot 30 so as not to allow for bending back and breaking of the snaps 35. Also, the alignment slot 20 defines the maximum angles of inclination.

Figure 7:
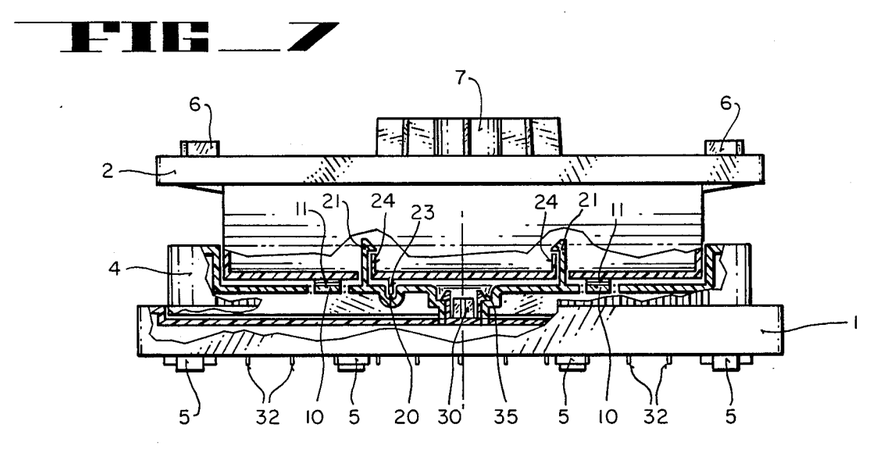
FIG. 7 shows a front cross-sectional view of the present invention.

FIG. 7 shows a front cross-sectional view of the present invention. The monitor mount 7 and nubs 6 are shown atop platform 2. Platform 2 is also shown having a fin 23. Fin 23 fits into the alignment slot 20 of swivel piece 4 and together they control the maximum angles of inclination.

Platform 2 and swivel piece 4 are coupled by two different interactive couplings. One is the coupling formed by hooks 21 and alignment walls 24. By virtue of these couplings both platform 2 and swivel piece 4 are held together so as not to be able to be separated. Also alignment wall 24 and hooks 21 serve to correctly position the top 25 of swivel piece 4 and the bottom of platform 2. The other coupling is between cantilevered pawls 10 and racks 11. Cantilevered pawls 10 and racks 11, when meshed together, create the strong static friction which enables the angle of inclination to be dynamically altered yet remain stable during application of only substantially downward forces.

The coupling of swivel piece 4 and base 1 is also shown. The snaps 35 extend over the interior surface of swivel piece 4. Both snaps 35 are backed by pivot 30. It can be seen from FIG. 7 that the base 1 has a circular depression which receives the circular shaped bottom of the swivel piece 4.

The supports of base 1 are shown protruding from the bottom of base 1. Four feet 5 are shown. The two middle feet are singular and are located approximately adjacent to pivot 30. The other two feet 5 are positioned at the front of base 1 at their respective corners. Each of these has a corresponding foot 5 at the rear corners of base 1. On the bottom of base 1, in addition to feet 5, is a matrix of row/column support ribs 32. These are used to distribute the weight of the monitor that the stand is supporting.

It is fin 23 in conjunction with alignment slot 20 that defines the maximum angles of inclination for the platform 2. Normally fin 23 does not contact the sides of alignment slot 20. However, at the two ends of alignment slot 20, fin 23 will contact the ends of slot 20 and not allow the level of inclination to get any lesser or greater.

FIG. 8 shows a bottom view of the platform 2. Diagonal support ribs 31 provide strength and extend from the rear corners to the bottom 200 which is convexly curved. It is the bottom 200 of platform 2 which fits into the concavely curved top 25 of swivel piece 4. The bottom 20 includes two racks 11. Two openings 22 are located between the two racks 11 to receive the hooks 21. Fin 23 is located between the two catch holes 22.

The openings 22 allow for the penetration of hooks 21 through the bottom 200 of the platform 2. As shown in FIG. 7, the hooks 21 must be bent to fit through the openings 22. Only once sufficiently far through openings 22 will hooks bend back to their natural position, latching together the platform 2 and swivel piece 4. FIG. 8 shows that fin 23 extends downward from the bottom 200. Fin 23 fits into the alignment slots 20 of swivel piece 4. Alignment slot 20 and fin 23 in combination define the allowable angles of inclination as described above.

In the preferred embodiment, an industrial plastic is used for the platform 2, swivel piece 4 and base; a typical plastic may be Cycolac ® KJC ABS of the flame retardant injection molding grade. The walls of the stand have a thickness of approximately 4 mm. The various ribs of the stand have a thickness of approximately 2 mm. The only components of the stand which are not ABS plastic are the low friction discs 12 and the feet 6. The low friction discs 12 are made of ultra high molecular weight Polyethylene, as described previously. The feet 6 are made of Polyurethane, and have the dimensions of approximately $12 \times 25 \times 6$ mm.

The overall dimensions of the base 1 are, in the preferred embodiment, approximately $365.5 \times 284.4 \times 18$ mm (height not including extension of feet or ribs). The platform 2 has the dimensions of approximately $324.8 \times 262.0 \times 12$ mm (height not including that of the arc section). The cover 3 has dimensions of approximately $206.25 \times 197.5 \times 3.88$ mm (height not including the monitor mount). Swivel piece 4 has a radius of approximately 128.0 mm and its arc surface 26 has the dimensions of approximately $208.0 \times 141.2$ mm.

While a particular embodiment of the invention has been described, it will be appreciated that many modifications may be made with the scope and spirit of the invention as described by the following claims.

We claim:

1. A monitor stand apparatus for placing and positioning a computer monitor comprising:
   a platform having a convexly curved bottom and having a rack means;
   a swivel piece means having a concavely curved top that is matched to accept and fit said convexly curved bottom, said top having pawl means for engaging said rack means, said pawl means being an integral part of said top, said pawl means cooperatively engaging said rack means to latch said platform in a fixed angular position of inclination and said pawl means and said rack means disengaging when a horizontal force is applied to said platform to allow changes in the angular position of inclination of said platform, said swivel piece having a hole located near the center of said swivel piece, said hole acting as a hole for rotating said swivel piece;
   a base, coupled to said swivel piece means by a pivot means for allowing change in the angle of rotation of said platform relative to said base.

2. The monitor stand apparatus as described in claim 1 where said platform has a reversible cover on its top with monitor mounts on both sides of said cover for affixing and positioning said monitor on said platform for at least two different configurations of computer monitors.

3. The computor monitor stand apparatus as described in claim 2 where said platform has alignment means positioned to the back of said platform for aligning said monitor.

4. The computor monitor stand apparatus as defined in claim 3 where said alignment means comprises two upwardly protruding nubs located at the rear corners of said platform.

5. The computor monitor stand apparatus as described in claim 4 wherein said pivot means include a single circularly shaped molding fitting said hole to pivot around to change the rotational angle.

6. The computor monitor stand apparatus as described in claim 5 where said base has row and column ribs running under its upper surface for supporting the weight of said monitor.

7. A computor monitor stand apparatus for positioning and placing a monitor, comprising:
   a base having a rectangular shape and having a pivot means in a circular depression located towards the center of the front of said base for rotating said monitor around a predetermined angle, said pivot means comprising a pin projecting upwardly from said base and having a latching means,
   a swivel piece, having a hole designed to receive said pivot means of said base, said hole having an edge to engage said latching means of said pivot means, said swivel piece fitting in said circular depression such that said swivel piece has the ability to rotate around said pivot means, said swivel piece having a concavely curved top having a cantilevered pawl means, said cantilevered pawl means having teeth and being an integral part of said top;
   a platform, having a convexly curved bottom and having a rack means on said convexly curved bottom, said convexly curved bottom being matched to fit into said concavely curved top of said swivel piece, said rack means having corresponding teeth designed to cooperatively engage said teeth of said cantilevered pawl means to latch said platform in a fixed angular position of inclination when no substantial horizontal force is applied to said platform, said cantilevered pawl means and said rack means disengaging when a substantially horizontal force is applied to said platform thereby allowing changes in the angular position of inclination of said platform.

8. The computor monitor stand apparatus as described in claim 7 where said teeth of said cantilevered pawl have peaks forming right angles and valleys forming slightly obtuse angles, and said corresponding teeth have peaks that match the valleys of said cantilevered pawl and have valleys that match the peaks of said teeth of said cantilevered pawl.

9. The computor monitor stand apparatus as described in claim 8 where said swivel piece has a fin on the bottom of said swivel piece, and said base has in said circular depression an arc channel such that said fin projects into said arc channel and said arc channel defines the possible angle of rotation of said swivel piece.

10. The computor monitor stand apparatus as defined in claim 9 where said computor monitor stand apparatus is made of ABS plastic.

* * * * *

UNITED STATES PATENT AND TRADEMARK OFFICE
CERTIFICATE OF CORRECTION

PATENT NO. : 4,852,830
DATED : 08/01/89
INVENTOR(S) : Howard et. al.

It is certified that error in the above-identified patent and that said Letters Patent is hereby corrected as shown below:

Title page:

[54]  delete "MONITER" insert --MONITOR-- and Column 1, line 2.

col. 01, lines 06, 13, 14, 19, 22, 54, 58 & 62  delete "computor" insert --computer-- col. 07, line 66  delete "base." insert --base, said pivot means comprising a pin projecting upwardly from said base and having a latching means, said hole having an edge to engage said latching means of said pivot means.

col. 08, lines 05, 13, 17, 21, 52, 59 & 65  delete "computor" insert --computer-- col. 08, line 14  delete "include" insert --includes--

Signed and Sealed this

Ninth Day of July, 1991

*Attest:*

HARRY F. MANBECK, JR.

*Attesting Officer*  *Commissioner of Patents and Trademarks*